Nov. 18, 1969   F. ARMBRUSTER ET AL   3,479,421
METHOD OF MOLDING HOLLOW BODIES
Original Filed Aug. 5, 1965
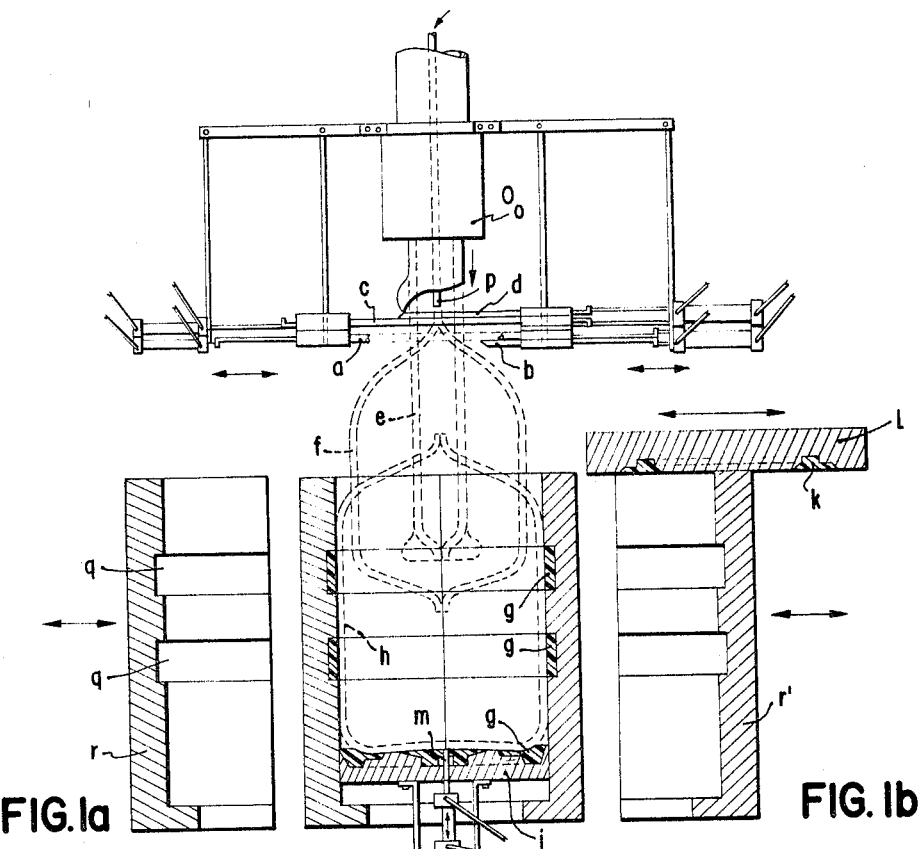
FIG.1a   FIG. 2   FIG.1b
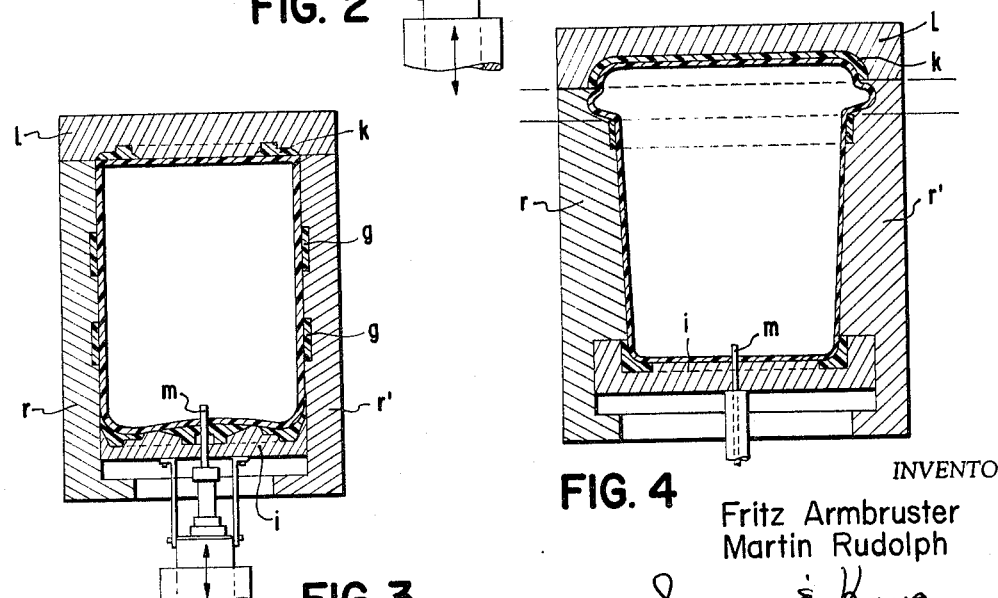
FIG. 3   FIG. 4
INVENTORS.
Fritz Armbruster
Martin Rudolph
BY 
ATTORNEYS.

United States Patent Office 3,479,421
Patented Nov. 18, 1969

3,479,421
METHOD OF MOLDING HOLLOW BODIES
Fritz Armbruster, Stuttgart-Stammheim, and Martin Rudolph, Velbert, Rhineland, Germany; said Armbruster assignor to Diener & Roth, Stuttgart, Germany, a German firm
Original application Aug. 5, 1965, Ser. No. 483,902. Divided and this application Nov. 16, 1967, Ser. No. 701,500
Claims priority, application Germany, Aug. 5, 1964, A 46,773
Int. Cl. B29c 17/07; B29h 7/02; B29d 31/00, 23/03
U.S. Cl. 264—98    1 Claim

ABSTRACT OF THE DISCLOSURE

A method of manufacturing symmetrical hollow plastic containers provided with reinforcements which are disposed on at least one of the end faces of the container, in which a hose is extruded from an extruder and a piece of hose, having a length corresponding to that of the container being manufactured, is closed, which piece of hose is introduced into a divided blowing mold and is then inflated. The piece of hose is preliminarily inflated and is separated from the consecutive hose thereby to provide an independent gastight preliminary molding piece, which piece is then introduced into the open, reinforcements carrying blowing mold. After the mold is closed, the piece is further inflated for imparting to it its final shape.

---

This application is a division of application Ser. No. 483,902 filed Aug. 5, 1965, now abandoned.

The present invention relates to a method for blow molding hollow bodies of synthetic materials wherein a plasticized tube flows from an extrusion nozzle under the influence of gravity between the two separated halves of a blow mold, and when the blow mold is closed, it is sealed in a gastight manner at its upper and lower end by the joining halves of the blow mold. The invention further relates to the production of a hollow body provided with reinforcements about its circumference, wherein the reinforcements are mounted to the inner wall of the blow mold and are fixedly joined to the produced hollow body during the blowing process.

Reinforcements are provided about the circumference of the hollow body during the blowing process for strengthening the walls of the body and are generally in the shape of a closed ring in order to provide a continuous reinforcement about the annular portion of the body. The known blowing processes, however, using conventional blow molds of at least two parts have experienced great difficulty in using a closed ring as a reinforcement. Therefore, the prior art, in order to overcome this difficulty and still provide a reinforcement, devised the method wherein the reinforcement rings are divided into segments corresponding to the arcuate length of the individual mold part and the reinforcement segments are then joined together by the material used for producing the blown body. Another method for joining the segments to form a closed ring has been to fashion the front faces of the reinforcing segments such that they can be connected with one another in a flush manner. However, the prior methods are both cumbersome and expensive.

Accordingly, an object of the present invention is the provision of a method for blow molding hollow bodies.

It is another object of the invention to provide a hollow body having closed reinforcing rings joined thereto.

It is a further object of this invention to provide hollow bodies having a uniform wall thickness.

The present invention provides a method for blow molding hollow bodies wherein a plastic tube flowing from an extrusion nozzle is closed at its lower end by means of a clamping device provided above the mold and is blown up to a diameter smaller than that of the blow mold. The tube is then sealed by means of a clamping device at a distance from its lower end corresponding to the height of the blowing mold and is separated from the strand of plastic. After separation, the tube is lowered into the mold which is open at the top, whereupon the mold closes and a blow needle or lance is inserted into the interior of the tube and the container shape is blown. The separation of the gas-filled tube already sealed at its upper end may also be accomplished after the tube has already been partially inserted into the blowing mold.

Additional objects and advantages of the present invention will become apparent upon consideration of the following description when taken in conjunction with the accompanying drawings in which:

FIGURES 1a and 1b are vertical sections through the two separated halves of the blow mold.

FIGURE 2 is a schematic representation of an embodiment of the invention including a vertical section through the blow mold closed except for the open top portion front face; a side view of the nozzle head provided above the blow mold and the compressing and separating devices.

FIGURE 3 is a vertical section through the closed blow mold after the blowing process, and FIGURE 4 is a vertical section through a blow mold for producing a bucket and a lid.

Referring now to the drawings, there is shown in FIGURE 2, a tubular strand of plastic or synthetic material, shown in dashed line, flowing from an extrusion device o and being clamped together by means of compression jaws a with the remainder of the tube material below the compressed spot being severed from the tube by a cutting knife b. The tube e is thereby sealed at its lower end and is lowered into the blow mold while being simultaneously inflated by means of a gas line p provided in the nozzle, until the tube has assumed the shape approximately as shown at f. The inflated tube is then sealed off at its upper end by means of a compression device c and severed from the tubular strand flowing from the nozzle by means of a cutting knife d. The closed tube or bag f is then lowered into the blow mold which is provided with slots q into which reinforcements g are placed before the blow mold halves r and r' depicted in FIGURES 1a and 1b are closed completely. The inflated plastic bag now assumes the shape of the inner wall of the blow mold, as indicated by h, wherein the gas filling of the bag supports the bag against the inner wall thereby reducing the tendency of the bag to stretch and preventing the formation of folds in the produced hollow body. Therefore, by inflating the bag to the desired degree, a uniform wall thickness is ensured at all places of the bag. The tendency of the bag to stretch may be further resisted by raising the upwardly movable bottom plate i of the blow mold to contact the bottom of the bag before it is completely lowered into the mold. The plate i thereby supports the bottom of the bag and further ensures a uniform wall thickness for the body. After the bag which was prefilled with gas has been completely lowered into the blow mold, the top portion or cover piece l is placed on the blow mold. A reinforcing ring k can be inserted in the cover piece l by conventional mounting means (not shown) which releases the ring from the cover piece after the blowing process has been carried out and before the cover piece l is removed, so that the integral joint of the reinforcing ring with the hollow body is maintained. The final step in the blowing process is the insertion of the blow needle m through the bottom plate i into the interior of the hollow body. Gas under pressure is then conducted through the needle into the hollow body whereby the hollow body is given its final shape corresponding to the blow mold, as illustrated in FIGURE 3. The needle m is then retracted while the material is soft whereby the material seals the needle hole and is thereafter allowed to harden. After the hollow body has sufficiently hardened, the lateral wall portions of the blow mold are again separated with the cover piece l being previously lifted if it does not contact in a planar manner the front faces of the two wall portions of the blow mold for the purpose of forming a flush connection with the front faces.

The method according to the invention also permits the production of hollow bodies as illustrated in FIGURE 4. After the hardening, an annular zone is cut from the body, as shown in FIGURE 4 by the two horizontal section lines, wherein the lower portion of the hollow body represents, for example, a bucket and the upper portion located above the removed annular zone represents the lid of the bucket.

The operation of the clamping and severing devices may be controlled in dependence upon the speed of the extrusion process. The clamping and severing devices are preferably operated by means of hydraulic or pneumatic pistons which also effect the return of the devices into an opened starting position wherein they are ready for the following operations. The devices are preferably structurally connected with the extrusion apparatus. It is also noted that the cutting knives for the severing of the tube are provided with a curvature adapted to the container to be manufactured in the plane at right angles to the cutting direction.

Thus, the process of the present invention has the advantage that reinforcements in the shape of closed rings may be introduced into the blow mold before the latter is assembled and may be sufficiently fastened at the bottom and to the wall of the mold. The inflation of the plastic tube is conducted to such a degree that, when the tube is lowered into the blow mold, it rests on the wall of the blow mold and is supported thereby and thus resists stretching and provides for a tube having a uniform wall thickness. The feature of having the tube rest at the wall of the mold may be improved by lifting the bottom of the blow mold, before the inflated tube is introduced into the mold, until it contacts the lower end of the tube, and by then lowering it again together with the tube. The bottom of the blow mold thus serves as a support for the gas-filled tube and thereby prevents stretching of the partially gas-filled tube which is generally freely suspended. Consequently, a uniform thickness of the wall is obtained and the wall thickness may be kept relatively small, thus providing a saving in raw material.

What is claimed is:

1. A method for blow molding hollow plastic bodies of synthetic material from a plastic tube comprising the steps of:
    (a) sealing the tube at its lower end;
    (b) inflating a portion of the tube;
    (c) sealing the tube at a distance spaced from its lower end to form a closed bag;
    (d) placing the bag into a mold having an open end;
    (e) temporarily holding a unitary reinforcement member on the inner surface of a mold cover member for the said open end of the mold and closing the end of the mold with the cover member, said reinforcing member being so positioned and of such dimensions that it faces the interior of the mold and covers at least the outer periphery of that portion of the area of the cover member which when the cover member closes the end of the mold, faces the interior of the mold; and
    (f) further inflating the bag to join the end of said bag to the reinforcement member, and to provide a reinforced hollow body of the desired shape.

References Cited

UNITED STATES PATENTS

| | | |
|---|---|---|
| 2,959,812 | 11/1960 | Allen. |
| 3,300,556 | 1/1967 | Battenfeld et al. _____ 264—98 |
| 3,311,684 | 3/1967 | Heider _____ 264—99 |
| 3,342,916 | 9/1967 | Peters _____ 264—98 |

ROBERT F. WHITE, Primary Examiner.

T. J. CARVIS, Assistant Examiner

U.S. Cl. X.R.

264—98, 278